Jan. 15, 1946.  I. N. REED  2,392,880
VALVE
Filed Nov. 15, 1943  3 Sheets-Sheet 1
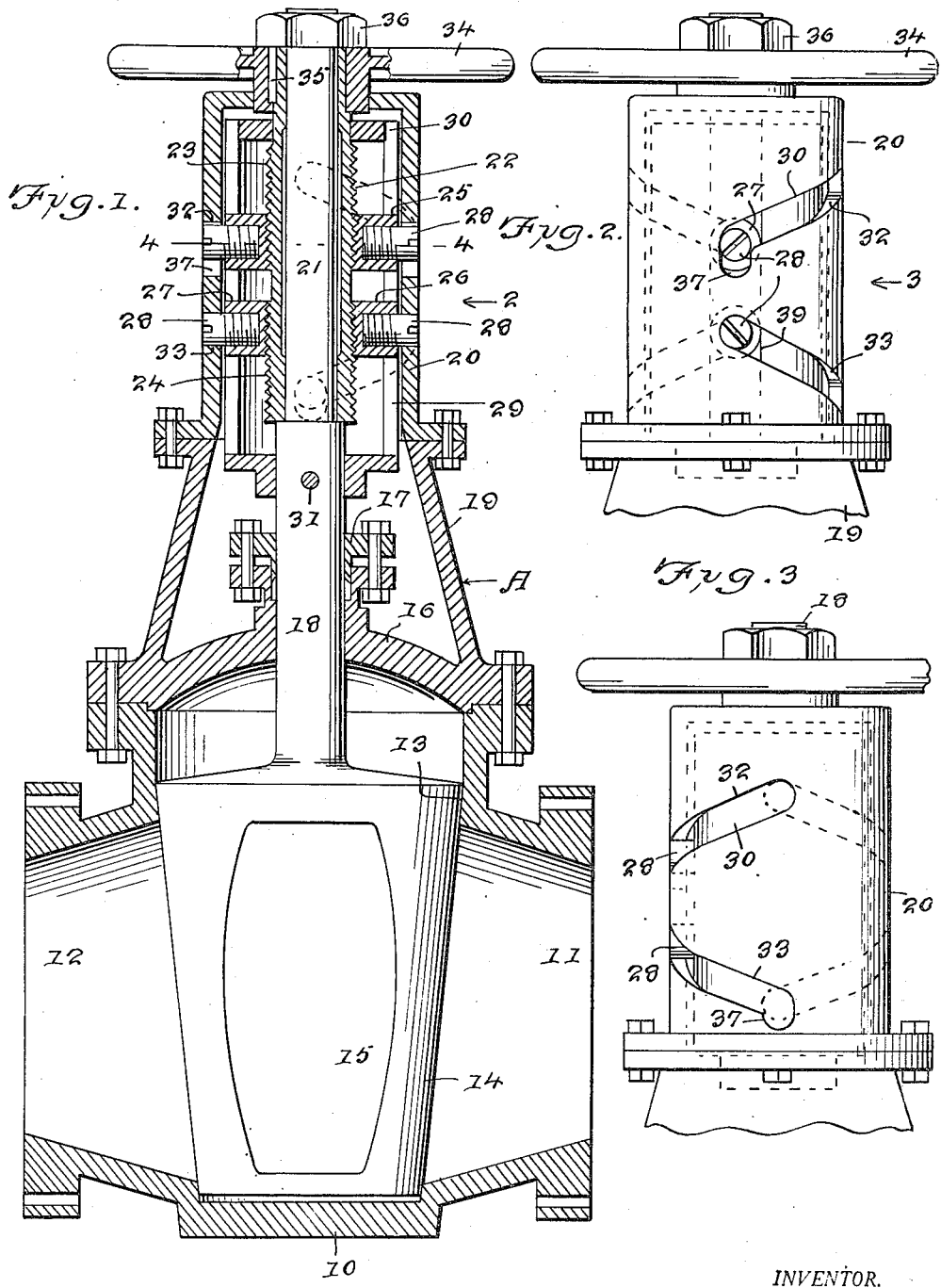
INVENTOR.
Isaac N. Reed
BY
Victor J. Evans & Co.
ATTORNEYS

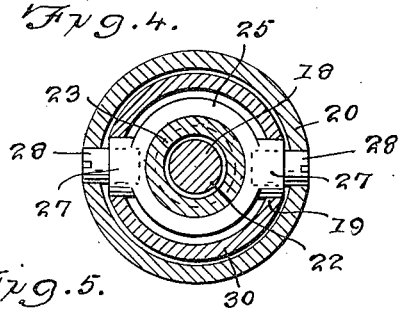
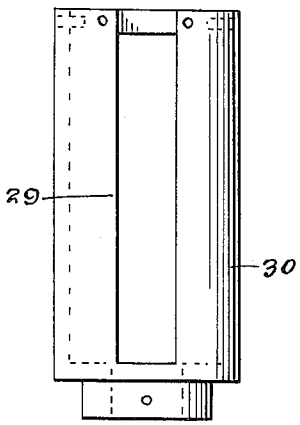
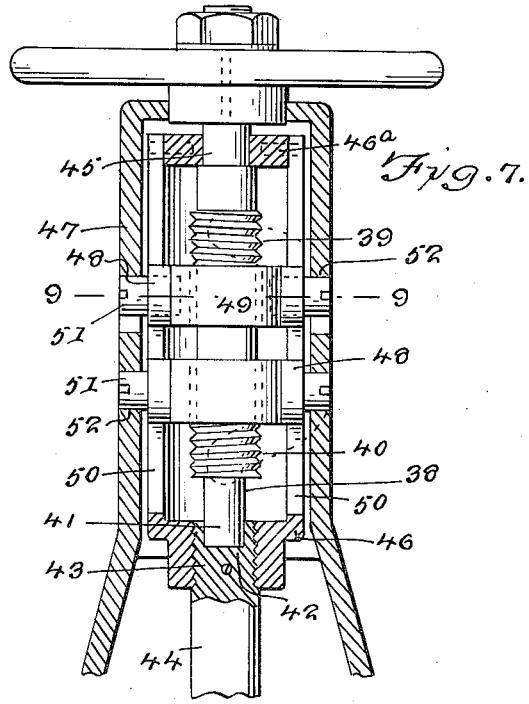
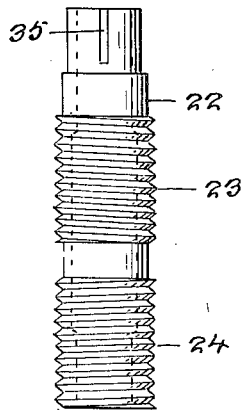
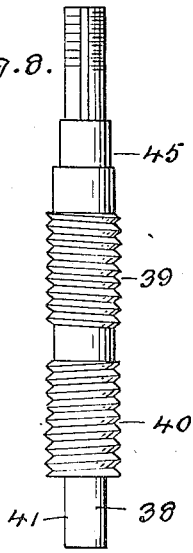
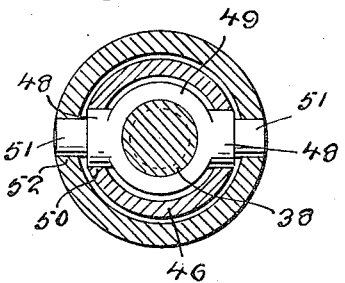

Jan. 15, 1946.  I. N. REED  2,392,880
VALVE
Filed Nov. 15, 1943  3 Sheets-Sheet 3
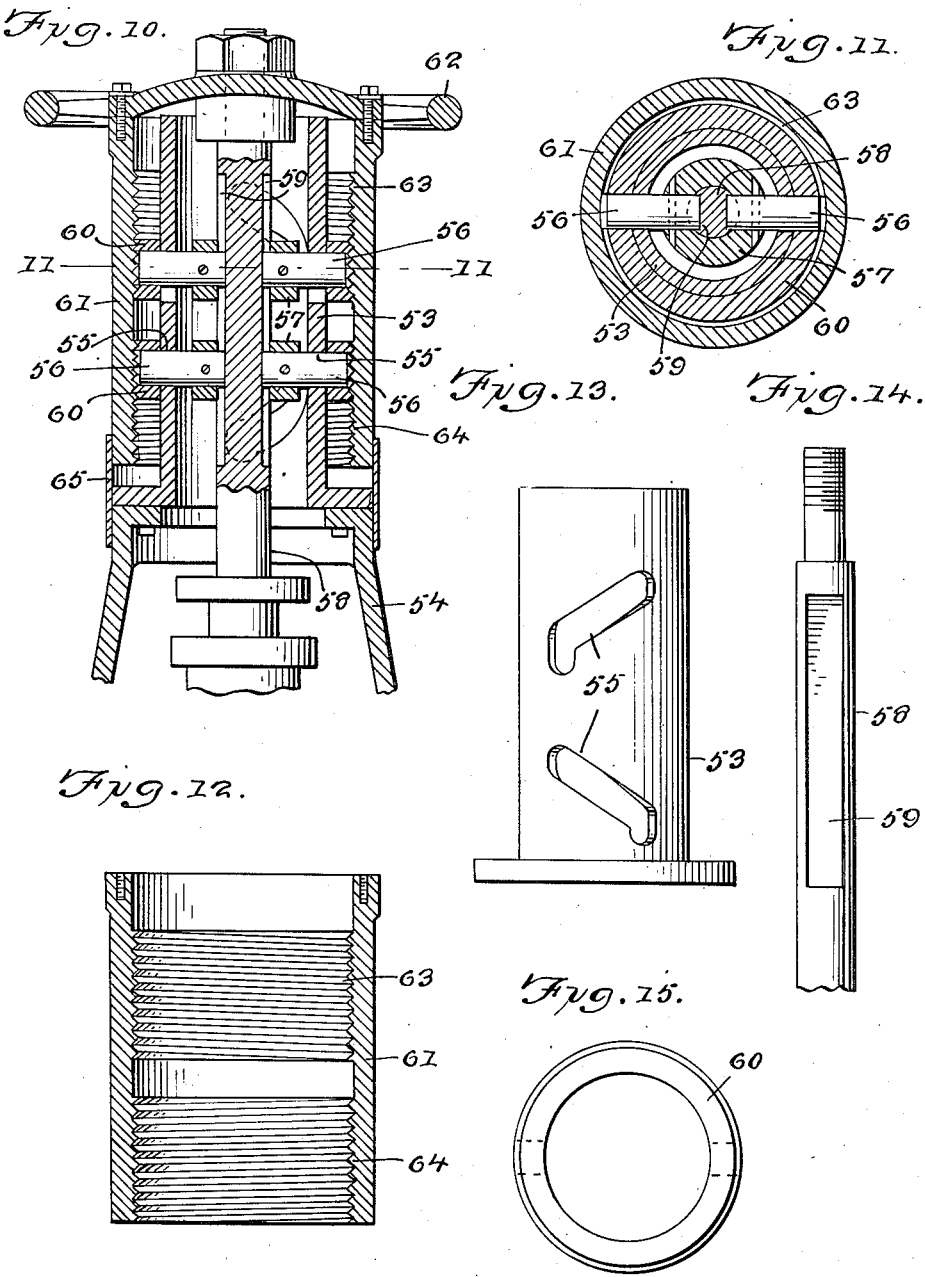
INVENTOR.
Isaac N. Reed
BY
Victor J. Evans & Co.
ATTORNEYS Patented Jan. 15, 1946

2,392,880

UNITED STATES PATENT OFFICE 2,392,880

VALVE

Isaac N. Reed, Livingston, Ala., assignor to Wedgeplug Valve Company, New Orleans, La., a corporation of Louisiana Application November 15, 1943, Serial No. 510,346

4 Claims. (Cl. 74—22)

The invention relates to valves and more especially to plug cocks or valves.

The primary object of the invention is the provision of a valve or cock of this character, wherein the plug or valve proper is subjected to a circular motion, either clockwise or counterclockwise to give a lifting movement to the stem of such cock or valve on the opening thereof and to transmit a downward movement thereto when closing the same, the plug or valve stem being locked against turning movement during initial lifting motion and during the final seating motion of the valve or plug, these motions of the valve or plug occur during a simultaneous clockwise or counterclockwise operation of the hand wheel for the said stem.

Another object of the invention is the provision of a valve or cock of this character, wherein refinements are present over Letters Patent Nos. 1,894,196 and 2,125,810, dated January 18, 1933, and August 2, 1938, respectively, and is designed to be made up as an attachment unit to be attached to ordinary wrench type of cocks or valves now installed in pipe or other lines.

A further object of the invention is the provision of a valve or cock of this character, which is comparatively simple in its make-up, thoroughly reliable and efficient in operation, the parts being readily accessible for repair or replacement, strong, durable, easy of operation, and inexpensive to manufacture and install.

With these and other objects in view the invention consists in the features of construction, combination and arrangement of parts as will be hereinafter more fully described, illustrated in the accompanying drawings, which disclose the preferred embodiment of the invention, and as pointed out in the claims hereunto appended.

In the accompanying drawings:

Figure 1 is a vertical longitudinal sectional view through the valve or cock constructed in accordance with the invention.

Figure 2 is a fragmentary side view thereof looking toward Figure 1 in the direction of the arrow at that side denoted 2 therein.

Figure 3 is a view similar to Figure 2, looking toward the latter figure in the direction of the arrow at that side denoted 3 thereof.

Figure 4 is a sectional view on the line 4—4 of Figure 1, looking in the direction of the arrows.

Figure 5 is a side view of the cage part of the valve or cock.

Figure 6 is a side view of the operating screw for the valve or cock.

Figure 7 is a view similar to Figure 1 showing a slight modification.

Figure 8 is a side view of the operating screw for said modification.

Figure 9 is a sectional view on the line 9—9 of Figure 7.

Figure 10 is a view similar to Figure 7 showing another modification.

Figure 11 is a sectional view on the line 11—11 of Figure 10.

Figure 12 is a detail sectional view of the turning crown thereof.

Figure 13 is a side view of the cage part of the same.

Figure 14 is a side view of the operating member.

Figure 15 is an end view thereof.

Similar reference characters indicate corresponding parts throughout the several views in the drawings.

Referring to the drawings in detail, in Figures 1 to 6, A designates generally the plug valve or cock constituting the present invention which involves a casing 10 having the opposite open sides 11 and 12, respectively, as usual, while formed in this casing is the downwardly tapered valve plug seat 13, for the valve-plug proper 14, it having the port 15 therein for registering with the open sides 11 and 12, when the valve is opened.

Access is had to the casing 10 in the use of a removable cap or cover 16 provided with a central gland 17 through which extends a turning plug shaft or stem 18, the cap or cover 16 being formed with a yoke 19 which rises above the same about the shaft or stem 18. Stationarily supported by the yoke 19 is a cylindrical crowning body or head member 20 through which the reduced upper end 21 of the shaft or stem 18 passes. Upon this end 21 is journaled an operating screw in the form of a tube 22 having the separated external screw threads 23 and 24, respectively, which co-act with companion internally screw threaded collars 25 and 26, respectively. These collars, each has diametrically opposed socketed lugs 27 for removable pins 28, the lugs being adapted to movably fit parallel elongated slots 29 opposite each other in the side wall of a cylindrical cage 30 within the crowning body or head member 20. This cage 30 at its lower end is fast to the shaft 18 by means of a cross pin 31 engaging the said shaft or stem 18 below the reduced end 21 to avoid working interference with any part of the valve.

The pins 28 have trackage in spirally disposed grooves or slots 32 and 33, respectively formed in the body or head member 20, for the clockwise up movement and the counterclockwise down movement of the valve plug 14 when rotation is imparted to the shaft or stem 18 through the hand wheel 34 which is splined or keyed at 35 to the screw 22, while a nut 36 secures this wheel 34 to the reduced end 21 of the said shaft or stem 18. This nut 36 also holds the tube 22 on the end 21 of the stem 18.

The grooves or slots 32 and 33 have offset keeper notches 37 terminally thereof to receive the pins 28 and thus latching the latter in a vertical direction. The tube 22 is co-movable with the reduced end 21 of the shaft or stem 18, for the successful up and down vertical motion and circulatory movement of the valve plug, either clockwise or counterclockwise.

In Figures 7 to 9 of the drawings there is shown a modification of the invention, wherein the operating screw 38 with the external threads 39 and 40, respectively, has its lower end 41 journaled at 42 in the upper socketed end 43 of the shaft or stem 44 of the valve plug (not shown) and the upper reduced end 45 of this screw 38 journaled in the end 46a of the cage 46 which at its lower end is fixed to the said shaft or stem 44. The cage 46 is within the crowning body or head member 47. The lugs 48 of the collars 49 travel in the slots 50 in the cage 46, while the pins 51 travel in the grooves or slots 52 in the body or head member 47, as will be apparent in Figure 7 of the drawings.

In Figures 10 to 15 of the drawings there is shown a further modification of the invention, wherein a cage 53 is stationarily mounted on the yoke 54 which is also stationary on the valve casing and this cage has formed therein the spirally disposed grooves or slots 55 for the traveling pins 56 fixed in the floating collars 57 on the shaft or stem 58, the pins being also engaged in vertical channels 59 in opposite sides of the shaft or stem 58. The pins 56 further fit in floating collars 60 on the cage 53, which collars 60 are in threaded engagement with an internally threaded crowning body or head member 61 fixed to a hand wheel 62, which latter is also fitted to the shaft or stem 58, the threads on the body or head member 61 being indicated at 63 and 64, respectively. In each instance the operating threads are reversed.

A closure band 65 encircles the joints between the yoke 54, cage 53 and member 61 and is made fast in any manner.

It should be perfectly apparent from the disclosures of the preferred and modified forms of the invention disclosed in the drawings and the foregoing description that in operating the valve proper or plug triple movements thereof as set forth in the objects of the invention heretofore mentioned will be accomplished, so a more extended explanation has been omitted for the sake of brevity.

What is claimed is:

1. An operating mechanism for producing axial movement only of a plug valve stem during initial movement in opening and closing the valve, and both axial and rotational movement between the initial movement, comprising a tubular member on the valve stem having opposed screw threads, a cage about the tubular member having vertical slots, traveling members in the slot having threaded engagement respectively with the opposed screw threads at their inner ends, and a head member about the cage having spirally disposed grooves in which the other ends of said members operate respectively when the valve stem tubular member is rotated, and the spirally disposed grooves having offset terminal keeper notches to receive and latch the said means against vertical movement.

2. The invention as defined in claim 1 wherein said means includes internally threaded collars engaging the opposed threads respectively on the tubular member, and removable pins on the collars engaging in the spiral slots.

3. The invention as defined in claim 1 wherein the opposed threads on the tubular member are separated, and wherein the cage is vertically slotted and pinned to the valve stem, and the head member is fixedly connected with the valve coning, and wherein the spiral grooves are opposed.

4. An operating mechanism for producing axial movement of a plug valve stem during initial movement in opening and closing the valve, and both axial and rotational movement between the initial movements, comprising members disposed within each other, one of which has tracks axial with the stem, and the other opposed spiral tracks having terminal latching notches in the ends respectively, a member having opposed threaded portions and threaded travelers re-engaging each threaded portion and both engaging in the axial and the spiral tracks and seatable in the notches.

ISAAC N. REED.